United States Patent
Sundaram

(10) Patent No.: US 10,133,656 B2
(45) Date of Patent: Nov. 20, 2018

(54) SYSTEMS AND METHODS FOR GENERATING OPTIMIZED COVERING ARRAYS

(71) Applicant: Tata Consultancy Services Limited, Mumbai (IN)

(72) Inventor: Sukumar Sundaram, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 14 days.

(21) Appl. No.: 15/425,504

(22) Filed: Feb. 6, 2017

(65) Prior Publication Data

US 2017/0344465 A1    Nov. 30, 2017

(30) Foreign Application Priority Data

Feb. 8, 2016    (IN) .............................. 201621004490

(51) Int. Cl.
G06F 11/36    (2006.01)

(52) U.S. Cl.
CPC ...... G06F 11/3684 (2013.01); G06F 11/3688 (2013.01)

(58) Field of Classification Search
CPC ............. G06F 11/3676; G06F 11/3684; G06F 11/3688
USPC ................................................. 717/124–135
See application file for complete search history.

(56) References Cited

U.S. PATENT DOCUMENTS

| 8,019,049 | B2 | 9/2011 | Allen, Jr. et al. | |
| 2003/0208744 | A1* | 11/2003 | Amir .................... | G06F 11/3684 717/124 |
| 2006/0010426 | A1* | 1/2006 | Lewis ................. | G06F 11/3684 717/124 |
| 2012/0167059 | A1* | 6/2012 | Kosuda ............... | G06F 11/3676 717/131 |
| 2013/0090911 | A1* | 4/2013 | Segall .................. | G06F 11/263 703/21 |

OTHER PUBLICATIONS

Bryce et al., "Test Prioritization for Pairwise Interaction Coverage," May 2005, ACM, p. 1-7.*

(Continued)

*Primary Examiner* — Qing Chen
(74) *Attorney, Agent, or Firm* — Finnegan, Henderson, Farabow, Garrett & Dunner LLP

(57) ABSTRACT

This disclosure relates to systems and methods for generating covering arrays. By processing parameters and corresponding values pertaining to an application under test (AUT), the system generates a first set of arrays, wherein elements in the first set are unique from each other. A second set of arrays is generated by identifying two or more arrays from the first set. Each array in the second set may include pairwise interacting elements that are unique to each other. A third set of arrays is formed by interchanging pairwise interacting elements across the second set of arrays. Unique pairwise interacting elements are interchanged across set of arrays to eliminate from duplicating pairwise interacting elements. Combining two or more arrays from the third set of arrays results in an optimized covering array, which is then used for generating optimized test designs for at least one AUT.

10 Claims, 6 Drawing Sheets

(56) References Cited

OTHER PUBLICATIONS

Fouché et al., "Towards Incremental Adaptive Covering Arrays," Sep. 2007, ACM, p. 557-560.*
Kuhn et al., "Practical Combinatorial Testing: Beyond Pairwise," 2008, IEEE, p. 19-23.*
"An Introduction to Covering Arrays," <http://math.nist.gov/coveringarrays/coveringarray.html>, Apr. 17, 2008, p. 1-5.*
Cohen et al., "Constructing test suites for interaction testing", Proceedings ICSE '03, Proceedings of the 25th International Conference on Software Engineering, Portland, Oregon, IEEE Computer Society Washington, DC, USA, 11 pages, (2003).

* cited by examiner

| 0 | 1 | 2 |   | 3 | 4 | 5 |   | 6 | 7 | 8 |
|---|---|---|---|---|---|---|---|---|---|---|
| 1 | 2 | 0 |   | 4 | 5 | 3 |   | 7 | 8 | 6 |
| 2 | 0 | 1 |   | 5 | 3 | 4 |   | 8 | 6 | 7 |

|  | C1 | C2 | C3 | C4 | C5 | C6 | C7 | C8 | C9 | C10 | C11 | C12 | C13 | C14 | C15 | C16 | C17 | C18 | C19 | C20 | C21 | C22 |
|---|---|---|---|---|---|---|---|---|---|---|---|---|---|---|---|---|---|---|---|---|---|---|
| R1 | 8 | 1 | 3 | 0 | 5 | 7 | 1 | 3 | 8 | 5 | 7 | 0 | 3 | 8 | 1 | 7 | 0 | 5 | 6 | 2 | 4 | 0 |
| R2 | 1 | 3 | 8 | 5 | 7 | 0 | 3 | 8 | 1 | 7 | 0 | 5 | 8 | 1 | 3 | 0 | 5 | 7 | 2 | 4 | 6 | 0 |
| R3 | 3 | 8 | 1 | 7 | 0 | 5 | 8 | 1 | 3 | 0 | 5 | 7 | 1 | 3 | 8 | 5 | 7 | 0 | 4 | 6 | 2 | 0 |
| R4 | 6 | 2 | 4 | 1 | 3 | 8 | 2 | 4 | 6 | 3 | 8 | 1 | 4 | 6 | 2 | 8 | 1 | 3 | 7 | 0 | 5 | 0 |
| R5 | 2 | 4 | 6 | 3 | 8 | 1 | 4 | 6 | 2 | 8 | 1 | 3 | 6 | 2 | 4 | 1 | 3 | 8 | 0 | 5 | 7 | 0 |
| R6 | 4 | 6 | 2 | 8 | 1 | 3 | 6 | 2 | 4 | 1 | 3 | 8 | 2 | 4 | 6 | 3 | 8 | 1 | 5 | 7 | 0 | 0 |
| R7 | 7 | 0 | 5 | 2 | 4 | 6 | 0 | 5 | 7 | 4 | 6 | 2 | 5 | 7 | 0 | 6 | 2 | 4 | 8 | 1 | 3 | 0 |
| R8 | 0 | 5 | 7 | 4 | 6 | 2 | 5 | 7 | 0 | 6 | 2 | 4 | 7 | 0 | 5 | 2 | 4 | 6 | 1 | 3 | 8 | 0 |
| R9 | 5 | 7 | 0 | 6 | 2 | 4 | 7 | 0 | 5 | 2 | 4 | 6 | 0 | 5 | 7 | 4 | 6 | 2 | 3 | 8 | 1 | 0 |
| R10 | 4 | 7 | 1 | 0 | 3 | 6 | 1 | 4 | 7 | 6 | 0 | 3 | 7 | 1 | 4 | 3 | 6 | 0 | 4 | 7 | 1 | 1 |
| R11 | 6 | 0 | 3 | 5 | 8 | 2 | 3 | 6 | 0 | 2 | 5 | 8 | 0 | 3 | 6 | 8 | 2 | 5 | 6 | 0 | 3 | 1 |
| R12 | 2 | 5 | 8 | 7 | 1 | 4 | 8 | 2 | 5 | 4 | 7 | 1 | 5 | 8 | 2 | 1 | 4 | 7 | 2 | 5 | 8 | 1 |
| ⋮ |  |  |  |  |  |  |  |  |  |  |  |  |  |  |  |  |  |  |  |  |  |  |
| R123 | 5 | 2 | 8 | 8 | 5 | 2 | 5 | 2 | 8 | 8 | 5 | 2 | 5 | 2 | 8 | 8 | 5 | 2 | 7 | 4 | 1 | 4 |
| R124 | 8 | 5 | 2 | 2 | 8 | 5 | 8 | 5 | 2 | 2 | 8 | 5 | 8 | 5 | 2 | 2 | 8 | 5 | 1 | 7 | 4 | 4 |
| R125 | 1 | 7 | 4 | 4 | 1 | 7 | 1 | 7 | 4 | 4 | 1 | 7 | 1 | 7 | 4 | 4 | 1 | 7 | 3 | 0 | 6 | 4 |
| R126 | 3 | 0 | 6 | 6 | 3 | 0 | 3 | 0 | 6 | 6 | 3 | 0 | 3 | 0 | 6 | 6 | 3 | 0 | 8 | 5 | 2 | 4 |

FIG. 3D

SYSTEMS AND METHODS FOR GENERATING OPTIMIZED COVERING ARRAYS

PRIORITY CLAIM

This U.S. patent application claims priority under 35 U.S.C. § 119 to: India Application No. 201621004490, filed on Aug. 2, 2016. The entire contents of the aforementioned application are incorporated herein by reference.

TECHNICAL FIELD

This disclosure relates generally to covering array generation systems, and more particularly to systems and methods for generating covering arrays.

BACKGROUND

Covering arrays are combinatorial technical design objects deployed in "pairwise testing" or "t-wise testing" of systems including, but not limited to software, optical networks, communications and coding, mobile adhoc networks and circuits. Often, it has been observed that exhaustive testing is not an economical option. On the other hand, random testing is unreliable as it may fail to provide requisite quantum of test coverage. Covering arrays provide balanced approach where error detection comes from t-wise interactions of parameter values, while minimizing the number of tests.

The term "coverage" in a representative scenario signifies the degree of accuracy with which a set of sample configurations "covers" or encompasses a set of configurations under consideration. Whereas, "full coverage", in the context of covering array generation signifies that all configurations are chosen, "no coverage" indicates that none of the configurations are chosen. Different scenarios are created by combining these parameters that define the configuration. Applications that have multiple functional flows by combinations of various such parameters are termed as 'Combinatorial' type software applications. Typical examples for the 'Combinatorial' type software applications are the pricing of home loan products offered by banks, premium calculator of insurance policy, flight ticket reservation, etc.

The inventors here have recognized several technical problems with such conventional systems, as explained below. There are several challenges in software testing and assurance of 'Combinatorial' type applications. Some of the major challenges include: processing of a large number of test scenarios, identification and selection of suitable scenarios, lack of adequate coverage, greater testing effort and stretched testing cycle.

SUMMARY

Embodiments of the present disclosure present technological improvements as solutions to one or more of the above-mentioned technical problems recognized by the inventors in conventional systems. For example, in one embodiment, a processor-implemented method is provided. The processor implemented method comprising obtaining one or more parameters and one or more corresponding values pertaining to at least one application under test (AUT); generating a first set of arrays based on an analysis being performed on one or more parameters and one or more corresponding values, wherein two or more arrays in first set of arrays comprises elements that are unique from each other; identifying two or more arrays from first set of arrays to obtain a second set of arrays, wherein two or more arrays from second set of arrays comprises pairwise interacting elements that are unique from each other; interchanging pairwise interacting elements across two or more arrays in second set of arrays to obtain a third set of arrays; and combining two or more arrays from third set of arrays to form an optimized covering array. In one embodiment, the processor implemented method may further comprise generating one or more optimized test designs pertaining to at least one AUT based on optimized covering array. The pairwise interacting elements when interchanged across the second set of arrays form pairwise interacting elements in the third set of arrays that are unique from each other. In one embodiment, pairwise interacting elements in the third set of arrays are greater in number as compared to unique pairwise interacting elements in the second set of arrays. In one embodiment, unique pairwise interacting elements are interchanged across the second set of arrays to eliminate from duplicating pairwise interacting elements. In one embodiment combining two or more arrays from third set of arrays to form an optimized covering array comprises stacking two or more arrays from the third set of arrays in at least one of one or more sequences and one or more orientations. The covering array thus generated can be used effectively in generating optimized test designs for at least one AUT.

In another embodiment, a computer implemented system is provided. A system comprising a memory storing instructions, and one or more parameters and one or more corresponding values pertaining to at least one application under test (AUT); one or more communication interfaces; and a hardware processor coupled to the memory through the one or more communication interfaces. The hardware processor is configured by the instructions to execute: a first array generating module that generates a first set of arrays based on an analysis being performed on one or more parameters and one or more corresponding values, wherein two or more arrays in first set of arrays comprises elements that are unique from each other; an array grading module that identifies two or more arrays from first set of arrays to obtain a second set of arrays, wherein two or more arrays from the second set of arrays comprises pairwise interacting elements that are unique from each other; an elements interchanging module that interchanges the pairwise interacting elements across the two or more arrays in the second set of arrays to obtain a third set of arrays; and a covering array generating module that combines two or more arrays from the third set of arrays to form an optimized covering array. In one embodiment, the computer implemented system, further comprises a test design generating module that generates one or more optimized test designs pertaining to the at least one AUT based on the generated optimized covering array. In one embodiment, pairwise interacting elements when interchanged across the second set of arrays form pairwise interacting elements in the third set of arrays that are unique from each other. In one embodiment, pairwise interacting elements in the third set of arrays are greater in number as compared to unique pairwise interacting elements in the second set of arrays. In another embodiment, unique pairwise interacting elements are interchanged across the second set of arrays to eliminate from duplicating pairwise interacting elements. In an embodiment, the covering array generating module may combine two or more arrays from the third set of arrays to form an optimized covering array by stacking two or more arrays from the third set of arrays in at least one of one or more sequences and one or more orientations.

In yet another embodiment, one or more non-transitory machine readable information storage mediums comprising one or more instructions are provided. The instructions when executed by one or more hardware processors causes obtaining one or more parameters and one or more corresponding values pertaining to at least one application under test (AUT); generating a first set of arrays based on an analysis being performed on one or more parameters and one or more corresponding values, wherein two or more arrays in first set of arrays comprises elements that are unique from each other; identifying two or more arrays from first set of arrays to obtain a second set of arrays, wherein two or more arrays from second set of arrays comprises pairwise interacting elements that are unique from each other; interchanging pairwise interacting elements across two or more arrays in second set of arrays to obtain a third set of arrays; and combining two or more arrays from third set of arrays to form an optimized covering array. In one embodiment, the processor implemented method may further comprise generating one or more optimized test designs pertaining to at least one AUT based on optimized covering array. The pairwise interacting elements when interchanged across the second set of arrays form pairwise interacting elements in the third set of arrays that are unique from each other. In one embodiment, pairwise interacting elements in the third set of arrays are greater in number as compared to unique pairwise interacting elements in the second set of arrays. In one embodiment, unique pairwise interacting elements are interchanged across the second set of arrays to eliminate from duplicating pairwise interacting elements. In one embodiment combining two or more arrays from third set of arrays to form an optimized covering array comprises stacking two or more arrays from the third set of arrays in at least one of one or more sequences and one or more orientations. The covering array thus generated can be used effectively in generating optimized test designs for at least one AUT.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3B illustrates a second set of arrays generated based on two or more identified arrays from the first set of arrays in accordance with some embodiments of the present disclosure.

FIG. 3C illustrates a third set of arrays generated by interchanging pairwise interacting elements across two or more arrays in the second set of arrays in accordance with some embodiments of the present disclosure.

FIG. 3D illustrates an optimized covering array generation with one or more rows and one or more columns for at least one application under test in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
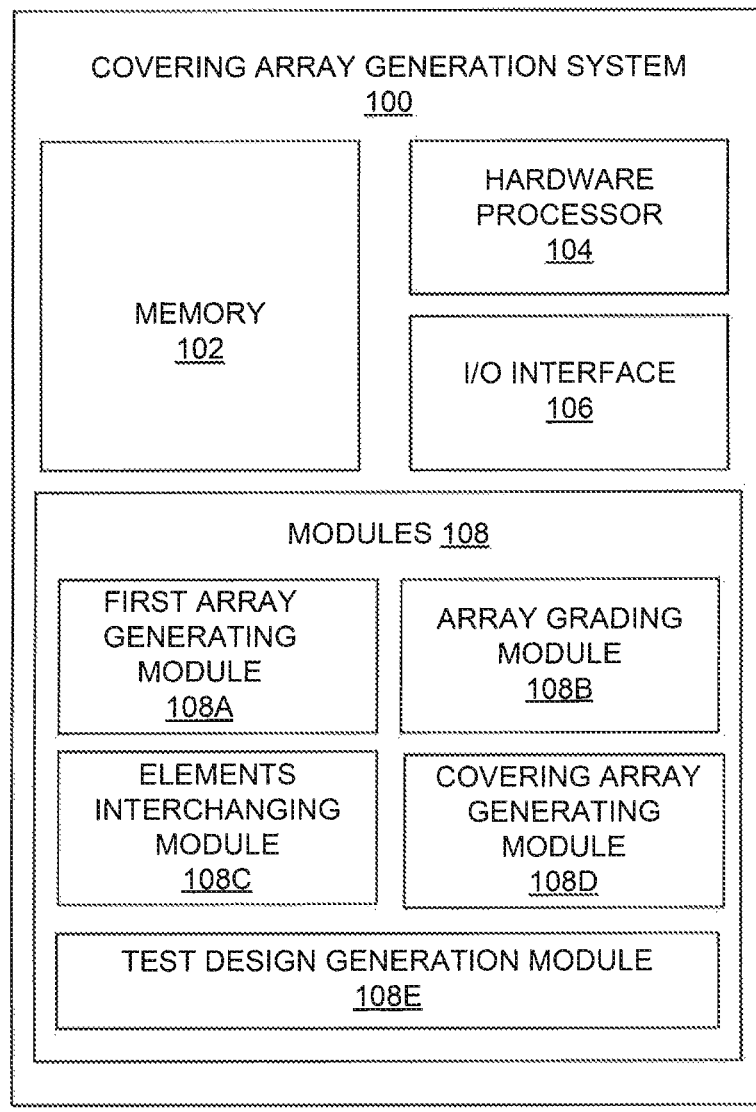
FIG. 1 illustrates an exemplary block diagram of a covering array generation system according to some embodiments of the present disclosure.

FIG. 1 illustrates an exemplary block diagram of a covering array generation system according to some embodiments of the present disclosure. The terms "covering array generation system" and "system" may be interchangeably used herein after. The system 100 comprises a memory 102, a hardware processor 104, and an input/output (I/O) interface 106. Although the exemplary block diagram and the associated description refers to a memory and a hardware processor, it may be understood that one or more memory units and one or more hardware processors may be comprised in the covering array generation system 100. The memory 102 further includes one or more functional modules 108. The memory 102, the hardware processor 104, the input/output (I/O) interface 106, and/or the 108 modules may be coupled by a system bus or a similar mechanism. The covering array generation system 100 generates covering arrays which can be further utilized in domains such as optimized test design systems utilizing covering array.

The memory 102, may store instructions, any number of pieces of information, and data, used by a computer system, for example the system 100 to implement the functions of the system 100. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, applications, instructions or the like for enabling the system 100 to carry out various functions in accordance with various example embodiments.

Additionally or alternatively, the memory 102 may be configured to store instructions which when executed by the hardware processor 104 causes the system 100 to behave in a manner as described in various embodiments. The memory 102 stores the functional modules and information, for example, software test optimization data design optimization, mobile adhoc networks data, optical network data etc.

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102. The hardware processor 104 may include circuitry implementing, among others, audio and logic functions associated with the communication. For example, the hardware processor 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 104 thus may also include the functionality to encode messages and/or data or information. The hardware processor 104 may include, among others a clock, an arithmetic logic unit (ALU) and logic gates configured to support operation of the hardware processor 104. Further, the hardware processor 104 may include functionality to execute one or more software programs, which may be stored in the memory 102 or otherwise accessible to the hardware processor 104.

The hardware processor 104 is configured by the instructions to execute a first array generating module 108a that generates a first set of arrays based on an analysis being performed on one or more parameters and one or more corresponding values. In an embodiment, two or more arrays in the first set of arrays comprise two or more elements that are unique from each other. The modules 108 further comprise an array grading module 108b that when executed by the hardware processor 104 identifies two or more arrays (also referred as "multiple arrays") from the first set of arrays to obtain a second set of arrays. In an embodiment, two or more arrays from the second set of arrays comprises two or more pairwise interacting elements (also referred herein as "multiple pairwise interacting elements") that are unique from each other. The modules 108 may further comprise an elements interchanging module 108c that when executed by the hardware processor 104 interchanges pairwise interacting elements across the two or more arrays in the second set of arrays to obtain a third set of arrays. The pairwise interaction elements when interchanged form more number of pairwise interaction elements in the third set of arrays such that the pairwise interaction elements in the third set of arrays thus formed are greater in number as compared the pairwise interaction elements in the second set of arrays, in one example embodiment. The pairwise interaction elements may also be referred herein as "pairwise interacting elements" and further be interchangeably used. The modules 108 further comprise a covering array generating module 108d that when executed by the hardware processor 104 combines two or more arrays from the third set of arrays to form an optimized covering array. The modules 108 may further comprise a test design generating module 108e that when executed by the hardware processor 104 generated one or more optimized test designs for the at least one application under test based on the optimized covering array.

The modules 108 for example, the first array generating module 108a, the array grading module 108b, the elements interchanging module 108c, the covering array generating module 108d, and the test design generating module 108e are implemented as at least one of a logically self-contained part of a software program, with a logically self-contained part of a software program embedded into each of the hardware component (e.g., the memory 102) that when executed perform the above method(s) described herein, in one embodiment.

Figure 2:
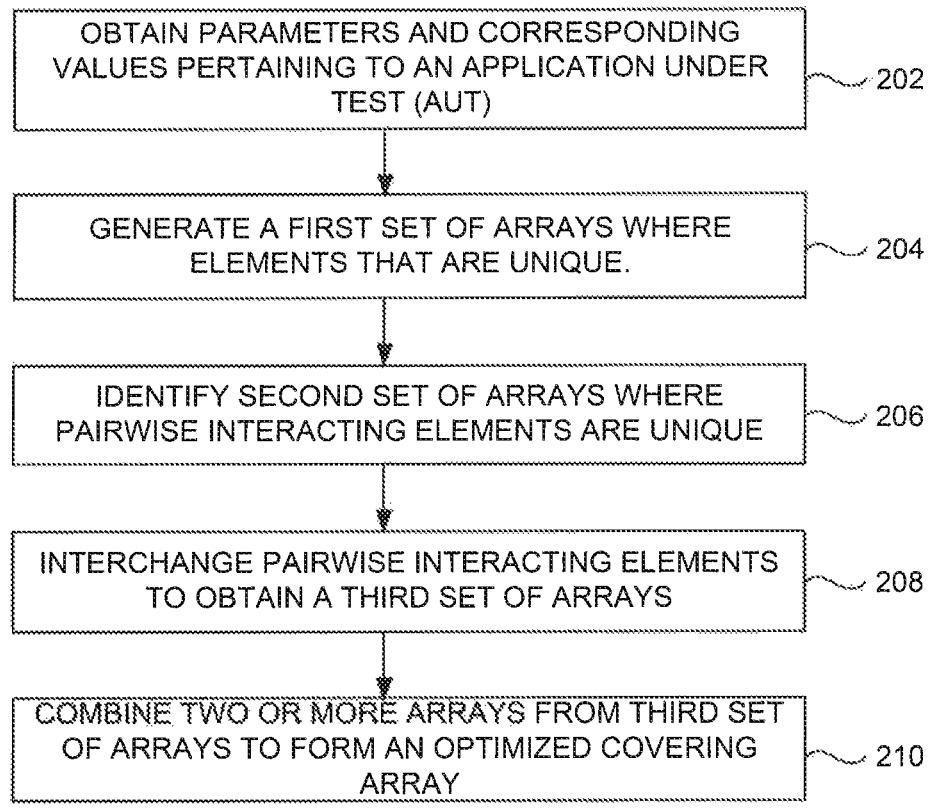
FIG. 2 is a flow diagram illustrating a computer implemented method for generating a covering array using the covering array optimization system in accordance with some embodiments of the present disclosure.

FIG. 2 is a flow diagram illustrating a computer implemented method for generating a covering array using the covering array optimization system in accordance with some embodiments of the present disclosure. The steps of the method of the present disclosure will now be explained with reference to the components of the system 100 as depicted in FIG. 1. In step 202, one or more parameters and one or more corresponding values pertaining to an application under test (AUT) are obtained. Further in step 204, a first set of arrays is generated based on an analysis being performed on the one or more parameters and the one or more corresponding values. In an embodiment, each of the arrays in the first set of arrays comprises elements that are unique from each other. In step 206, two or more arrays from the first set of arrays are identified to obtain a second set of arrays. Each of the arrays in the second set of arrays comprises pairwise interacting elements that are unique from each other are identified. In step 208, pairwise interacting elements are interchanged across two or more arrays in the second set of arrays to obtain a third set of arrays. In step 210, two or more arrays from said third set of arrays are combined to form an optimized covering array.

Figure 3A:
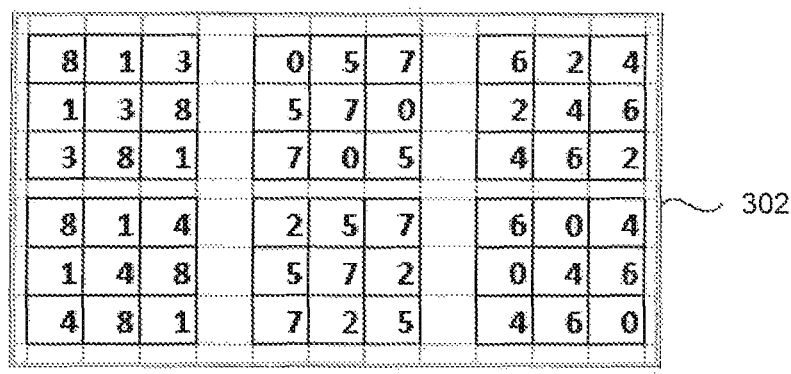
FIG. 3A illustrates a first set of arrays in accordance with some embodiments of the present disclosure.

FIG. 3A illustrates a first set of arrays in accordance with some embodiments of the present disclosure. In one embodiment, a covering array for a technical requirement, say a test design optimization scenario, with 22 parameters and 9 levels for each parameter is detailed out. Since there are 9 levels, three different groups each having three values can be formed. Further, a first set of arrays of order 3 are created. In this scenario, the possible number of first set of arrays of order 3 is 362880.

Figure 3B:
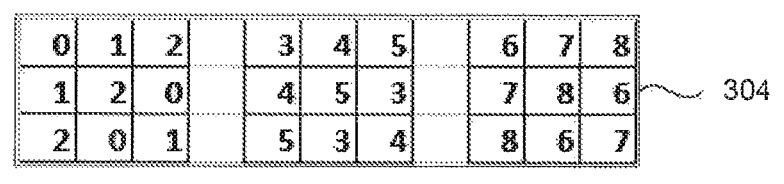

FIG. 3A, with reference to FIGS. 1-2, illustrates a first set of arrays 302 in accordance to an embodiment of the present disclosure. The term "first set of arrays" is also referred herein as "a set of smaller arrays" and may be interchangeably used. The first set of arrays comprises elements that are unique from each other. Furthermore, the first set of arrays identified earlier is sorted and a subset of the first set of arrays is obtained. The subset of the first set of arrays are illustrated and represented as 304 in FIG. 3B in accordance to an embodiment of the present disclosure. More particularly, FIG. 3B illustrates a second set of arrays generated (or obtained) based on two or more identified arrays from the first set of arrays in accordance to an embodiment of the present disclosure. The second set of arrays comprises pairwise interacting elements that are unique from each other. In the subsequent step, pairwise interacting elements are interchanged across the two or more arrays in the second set of arrays to obtain a third set of arrays.

Figure 3C:
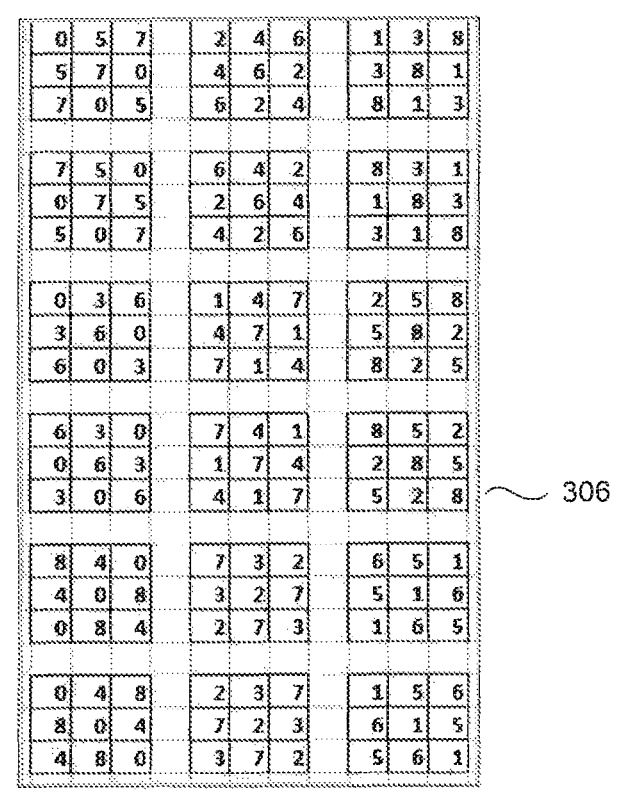

FIG. 3C, with reference to FIGS. 1 through 3B illustrates a third set of arrays 306 in accordance to an embodiment of the present disclosure. More particularly, FIG. 3C illustrates a third set of arrays generated by interchanging pairwise interacting elements across two or more arrays in the second set of arrays in accordance to an embodiment of the present disclosure. Mixing of elements introduces more number of unique pairwise interactions covered in the "miniscule arrays". Unique pairwise interacting elements are interchanged across the second set of arrays to eliminate duplicating pairwise interacting elements. In an embodiment, the second set of arrays is combined in to generate the third set of arrays. Two or more arrays from the third set of arrays are combined in one or more sequences and/or one or more orientations to form an optimized covering array.

In one embodiment where there are 22 columns having 9 levels each, a covering array with 126 rows and 22 columns is obtained. FIG. 3D, with reference to FIGS. 1 through 3C, illustrates an optimized covering array with one or more rows and one or more columns, in accordance with an example embodiment of the present disclosure. More particularly, FIG. 3D illustrates an optimized covering array with 126 rows (represented by R1, R2, till R126) and 22 columns (represented by C1, C2, till C22) for the at least one application under test, in accordance with an example embodiment of the present disclosure. The matrices highlighted in BOLD in FIG. 3D are indicative of the different orientation, sequence and alignment of array elements.

The embodiments of the present disclosure provides covering array generating systems and methods that enable to choose the right subset of arrays that will ensure unique pairwise interactions among the sorted arrays. Further, the embodiments enable interchanging of unique pairwise interacting elements and avoidance of duplication of elements. This improves the index of pairwise interaction elements. The embodiments of the present disclosure enables positioning, orientation and sequencing of the unique pairwise interacting elements to obtain an optimal covering array that could be used for generating optimized test design for applications under test.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for forming an optimized covering array used for generating one or more optimized test designs for at least one application under test (AUT), comprising:
    obtaining, via one or more hardware processors, one or more parameters and one or more corresponding values pertaining to at least one application under test (AUT);
    generating, by a first array generating module via the one or more hardware processors, a first set of arrays based on an analysis being performed on said one or more parameters and said one or more corresponding values pertaining to said at least one AUT, wherein two or more arrays in said first set of arrays comprises elements that are unique from each other;
    identifying, by an array grading module via the one or more hardware processors, two or more arrays in said first set of arrays to obtain a second set of arrays, wherein two or more arrays in said second set of arrays comprises pairwise interacting elements that are unique from each other are identified;
    interchanging, by an elements interchanging module via the one or more hardware processors, said identified pairwise interacting elements that are unique from each other across said two or more arrays in said second set of arrays to obtain a third set of arrays;
    combining, by a covering array generating module via the one or more hardware processors, two or more arrays in said third set of arrays to form an optimized covering array; and
    generating, by a test design generating module via the one or more hardware processors, one or more optimized test designs pertaining to said at least one AUT based on said optimized covering array.

2. The processor-implemented method of claim 1, wherein said pairwise interacting elements when interchanged across said two or more arrays in said second set of arrays form pairwise interacting elements in said third set of arrays that are unique from each other.

3. The processor-implemented method of claim 2, wherein said unique pairwise interacting elements in said third set of arrays are greater in number as compared to said unique pairwise interacting elements in said second set of arrays.

4. The processor-implemented method of claim 1, wherein said unique pairwise interacting elements are interchanged across said two or more arrays in said second set of arrays to eliminate duplicating pairwise interacting elements.

5. The processor-implemented method of claim 1, wherein combining two or more arrays in said third set of arrays to form an optimized covering array comprises stacking said two or more arrays in said third set of arrays in at least one of one or more sequences and one or more orientations.

6. A system for forming an optimized covering array used for generating one or more optimized test designs for at least one application under test (AUT), said system comprising:
    a memory, said memory storing instructions, and one or more parameters and one or more corresponding values pertaining to at least one application under test (AUT);
    one or more communication interfaces; and a hardware processor coupled to said memory through said one or more communication interfaces, wherein said hardware processor is configured by said instructions to obtain said one or more parameters and said one or more corresponding values pertaining to said at least one AUT, and to execute:
- a first array generating module that generates a first set of arrays based on an analysis being performed on said one or more parameters and said one or more corresponding values pertaining to said at least one AUT, wherein two or more arrays in said first set of arrays comprises elements that are unique from each other;
- an array grading module that identifies two or more arrays in said first set of arrays to obtain a second set of arrays, wherein two or more arrays in said second set of arrays comprises pairwise interacting elements that are unique from each other are identified;
- an elements interchanging module that interchanges said identified pairwise interacting elements that are unique from each other across said two or more arrays in said second set of arrays to obtain a third set of arrays;
- a covering array generating module that combines two or more arrays in said third set of arrays to form an optimized covering array; and
- a test design generating module that generates one or more optimized test designs pertaining to said at least one AUT based on said optimized covering array.

7. The system of claim 6, wherein said pairwise interacting elements when interchanged across said two or more arrays in said second set of arrays form pairwise interacting elements in said third set of arrays that are unique from each other.

8. The system of claim 7, wherein said unique pairwise interacting elements in said third set of arrays are greater in number as compared to said unique pairwise interacting elements in said second set of arrays.

9. The system of claim 6, wherein said unique pairwise interacting elements are interchanged across said two or more arrays in said second set of arrays to eliminate duplicating pairwise interacting elements.

10. The system of claim 6, wherein said covering array generating module combines two or more arrays in said third set of arrays to form an optimized covering array comprises stacking said two or more arrays in said third set of arrays in at least one of one or more sequences and one or more orientations.

* * * * *